Dec. 17, 1929.  J. R. REYBURN  1,739,522

CHAIN LINK

Filed Nov. 20, 1926

Patented Dec. 17, 1929

1,739,522

UNITED STATES PATENT OFFICE

JOHN R. REYBURN, OF FAIRFIELD, CONNECTICUT, ASSIGNOR TO AMERICAN CHAIN COMPANY, INC., A CORPORATION OF NEW YORK

CHAIN LINK

Application filed November 20, 1926. Serial No. 149,553.

This invention relates to chain links and more particularly to the case hardening of links in the cross chains in an anti-skid structure for vehicle wheels.

It has heretofore been the practice to use low carbon steel for tread chains.

Due to the characteristic properties of low-carbon steel and also to the peculiar qualities required by the nature of the service to which tread chain is subjected, there are two important quantities to be co-ordinated, namely, resistance to wear and resistance to breakage. Resistance to wear can be, and has been secured, by case-hardening steel chain of low-carbon content, but only to such a depth as to leave a soft metal core of substantial diameter to resist breakage. In substance, case-hardening the link produces a strand composed of a core of soft steel serving as a pliable supporting structure for a shell of case-hardened steel. It has heretofore been found, however, that for maximum efficiency a suitable balance between depth of case-hardening and diameter of core is impossible to obtain. If the case-hardening be carried to such a depth that a substantial portion of the contact area of the link may be worn away before the soft core is reached, the latter must be left so small in cross-section as to be insufficient to prevent breakage under many contingencies that take place in actual service. If, on the other hand, sufficient soft core be left to prevent breakage the shell is necessarily so thin that it is soon worn through at the contact area. Thereupon, the wear begins to be taken by the soft core, after which the link is, so far worn through at its contact areas, that it parts at these points at the slightest strain beyond the ordinary.

The factor which establishes such a low limit on the depth of case-hardening at the contact areas is the fact that the case-hardening is, as a necessary consequence of the process usually employed for that purpose, distributed over the entire surface of the link. Case-hardening, however, on those portions of the link not ordinarily subjected to wear is not only of no benefit but, on the contrary, is detrimental, because it unnecessarily increases liability to breakage.

It is therefore the object of my invention to provide a process that will case-harden such portions of the chain as are subject to wear, thereby setting up a relation between the hardened and unhardened portions of the links such that the quality of resistance to wear is so co-ordinated with the liability to breakage that a chain is produced that possesses a durability far in excess of that heretofore obtained.

Figure 1:
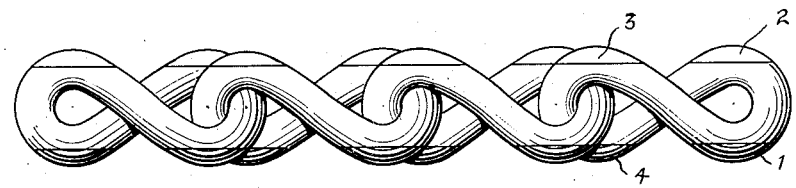
Figures 2, 3:
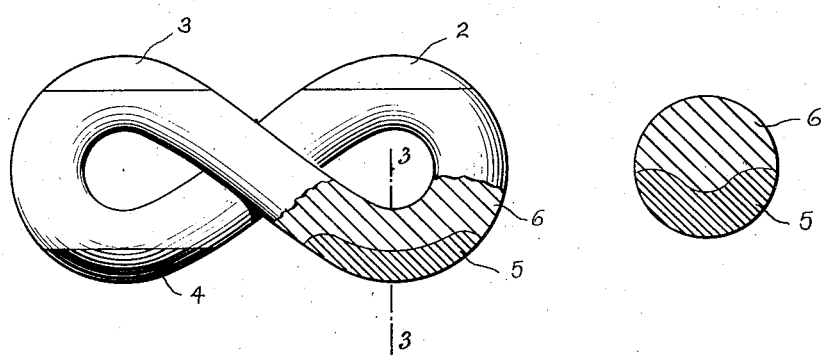

A clear conception of the construction and objects of the invention may be had from the following specification, in conjunction with the accompanying drawings in which Fig. 1 shows a series of links; Fig. 2 is a link partly in cross section; and Fig. 3 is a cross section through 3—3 of Fig. 2.

The invention may be incorporated in chain of the conventional type ordinarily known a curb chain. The links of this chain are twisted through an angle varying usually from 60° to 90° as shown in Fig. 1, so that each link presents four contact areas, 1, 2, 3 and 4 of limited dimensions, two only of these functioning at any given time. The basic structure of a link may consist of soft steel and if the hardening process is to be accomplished by case-hardening, this steel may be of low carbon content. The contact areas only, however, are hardened, as shown in Fig. 2, the remainder of the link being left soft, the numeral 5 designating the hardened portion and 6, the unhardened portion. The depth of the hardening may, it is to be observed, be considerable because the area which is soft offers the necessary resistance to breakage across any section through the hardened portion, and liability to breakage at other sections is reduced to that liability which is characteristic of the material of the basic structure. The hardening at the limited areas may be carried out in any suitable manner.

In the now preferred form of the invention, the chain may be thinly copper-plated by immersion in the usual manner in a bath of copper sulphate. The copper-plating may then be scraped off or otherwise removed from the contact areas and the chain subjected to any suitable case-hardening process.

Hardening will then take place only at the areas such as 5, from which the copper plate has been removed, and may be carried out to any desired depth.

In the example selected for illustration, the areas 1, 2, 3 and 4 are, as already noted, at regions which may be exposed to contacts with objects extraneous to the chain, but it is to be understood that other portions of the links may be similarly treated, without departing from the spirit of this invention.

Having thus described my invention, I claim:

In tread chain for anti-skid devices for vehicle wheels, twisted links comprising relatively pliable metal provided with localized integral hardened road contact areas.

In testimony whereof, I have signed this specification.

JOHN R. REYBURN.